United States Patent
Kim et al.

(10) Patent No.: US 12,271,251 B2
(45) Date of Patent: Apr. 8, 2025

(54) COMPUTING SYSTEM POWER BURST LIMITING

(71) Applicant: Microsoft Technology Licensing, LLC, Redmond, WA (US)

(72) Inventors: Donghwi Kim, Kirkland, WA (US); Gregory Allen Nielsen, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 18/170,224

(22) Filed: Feb. 16, 2023

(65) Prior Publication Data

US 2024/0168540 A1    May 23, 2024

Related U.S. Application Data

(60) Provisional application No. 63/384,711, filed on Nov. 22, 2022.

(51) Int. Cl.
*G06F 1/3296* (2019.01)
*G06F 1/3206* (2019.01)
*G06F 11/30* (2006.01)

(52) U.S. Cl.
CPC .......... *G06F 1/3296* (2013.01); *G06F 1/3206* (2013.01); *G06F 11/3058* (2013.01)

(58) Field of Classification Search
CPC ..... G06F 1/3058; G06F 1/3206; G06F 1/3296
USPC ...................................................... 713/320
See application file for complete search history.

(56) References Cited

U.S. PATENT DOCUMENTS

| | | | | |
|---|---|---|---|---|
| 8,447,994 | B2* | 5/2013 | Nussbaum | G06F 1/324 |
| | | | | 713/340 |
| 9,958,921 | B2* | 5/2018 | Jain | G06F 1/206 |
| 10,788,847 | B2* | 9/2020 | North | G06F 1/20 |
| 2010/0064162 | A1 | 3/2010 | Rotem et al. | |
| 2016/0034009 | A1 | 2/2016 | Wang et al. | |
| 2017/0131754 | A1 | 5/2017 | Zobel et al. | |
| 2017/0364130 | A1 | 12/2017 | Ho et al. | |
| 2020/0050920 | A1 | 2/2020 | Idgunji et al. | |
| 2020/0379544 | A1 | 12/2020 | Paul et al. | |

(Continued)

OTHER PUBLICATIONS

International Search Report and Written Opinion received for PCT Application No. PCT/US2023/033767 mailed on Jan. 3, 2024, 14 pages.

*Primary Examiner* — Brian T Misiura
(74) *Attorney, Agent, or Firm* — Alleman Hall & Tuttle LLP

(57) ABSTRACT

A system and method for controlling power consumption in a computing system. A burst power limit profile is established that permits consumption of power by the computing system to rise from a current power limit level to one or more elevated power limit levels that are above a thermal design power of the computing system. Upon expiration of the burst power limit profile, a thermal headroom of the computing system is determined based at least on one or more temperature limits. An attenuation power limit profile is then established based at least on the thermal headroom, such attenuation power limit profile having one or more reduced power limit levels that are lower than one or more of the elevated power limit levels of the burst power limit profile.

20 Claims, 3 Drawing Sheets

(56) References Cited

U.S. PATENT DOCUMENTS

2021/0216377 A1 7/2021 Arlagadda Narasimharaju et al.
2022/0365586 A1 11/2022 Kim et al.

* cited by examiner

COMPUTING SYSTEM POWER BURST LIMITING

CROSS REFERENCE TO RELATED APPLICATIONS

This application claims priority to U.S. Provisional Patent Application Ser. No. 63/384,711, filed Nov. 22, 2022, the entirety of which is hereby incorporated herein by reference for all purposes.

BACKGROUND

Computing systems generate heat during operation, largely as a function of moment-to-moment power consumption, particularly in processors. If rising temperatures go unchecked, the chassis of a device can warm to a point that negatively impacts the user. For example, an overly warm device can raise concerns in the user about whether the device is functioning properly, can be uncomfortable to touch, and in extreme cases can cause skin pain/injury. Excessive temperatures can also impact performance or cause damage to the device. In particular, high temperatures can cause device shutdown, cause processors to operate less efficiently or in an unstable manner, and result in component damage, among other problems.

DETAILED DESCRIPTION

Figure 1:
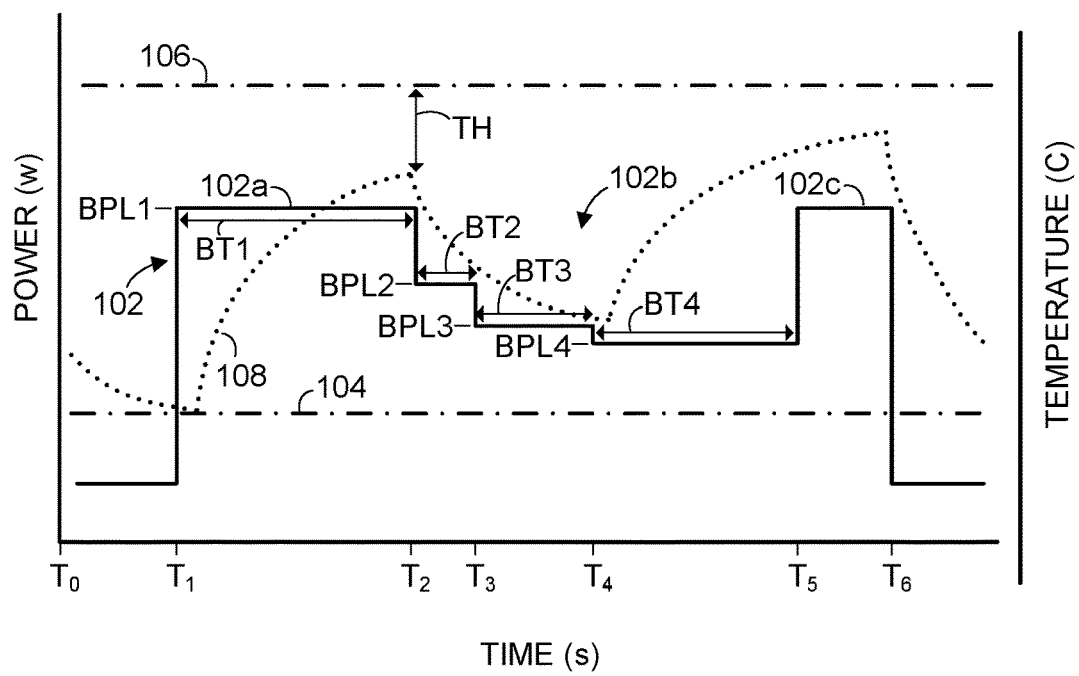
FIGS. 1 and 2 show exemplary power and temperature plots illustrating various power limit profiles that affect temperature conditions in a computing system.

Computing systems generate heat during operation, largely as a function of moment-to-moment power consumption, particularly in processors. If rising temperatures go unchecked, the chassis of a device can warm to a point that negatively impacts the user. For example, an overly warm device can raise concerns in the user about whether the device is functioning properly, can be uncomfortable to touch, and in extreme cases can cause skin pain/injury. Excessive temperatures can also impact performance or cause damage to the device. In particular, high temperatures can cause device shutdown, cause processors to operate less efficiently or in an unstable manner, and result in component damage, among other problems.

Accordingly, computing systems are typically designed with an eye toward managing temperature through choice of materials and control of operating states. Computing systems typically are designed to operate on average at or below a baseline steady state power level, or "thermal design power," at which the system can sustainably operate without causing excessive heat.

The present description sets forth systems and methods for managing power consumption in a computing system to provide improved performance while ensuring temperatures stay within prescribed limits. The approach involves an assessment of temperature(s) in relation to one or more threshold limits. The assessment may involve consideration of "thermal headroom," i.e., the difference between current temperature conditions and one or more temperature limits, with temperature management actions being dependent, in part, on the amount of headroom existing at a particular time.

The present examples contemplate two different temperature limits, though the concepts herein are applicable to one limit or more than two limits. The first is user-based and is referred to herein as "skin temperature." This refers to how warm the exterior surface portion of the device is and how it feels to the user. The example approaches herein operate to keep device temperatures (e.g., a chassis surface) below a skin temperature limit, so as to avoid negative user experiences such as skin discomfort/injury, and/or to avoid causing the user to be concerned that the device is malfunctioning or at risk.

The other limit is a device temperature limit relating to functioning of the computing system. The example approaches can operate also to maintain temperatures below this limit, to avoid decreases in performance, stability, efficiency, etc., and to avoid risk of damage to the system. As described below, one example of a device temperature limit is a junction temperature, such as in connection with a system-on-chip (SOC) package.

In the present examples, power consumption is permitted to burst to elevated levels above thermal design power. This will be referred to herein as establishing a burst power limit profile, which includes one or more elevated power limit levels that are above the thermal design power. Typically, this boosted/increased power limit level lasts for a period of time and, when power consumption rises accordingly, it can produce a rise in temperature (e.g., skin temperature, junction temperature). Upon expiration of the burst power limit profile, thermal headroom is determined/assessed and the power limit profile is adjusted based on the thermal headroom. In some examples, the adjustment takes the form of establishing an attenuation power limit profile that has one or more reduced power limit levels that are lower than one or more of the elevated power limits of the burst power limit profile. Such bursting provides the technical effect of selectively and intelligently increasing the power available to components and systems.

Further, in some implementations, different attenuation modes are contemplated based on the amount of thermal headroom. In one example mode, the attenuation power limit profile contemplates enforcing a relatively more pronounced reduction in power limit levels, for example when thermal headroom is below a minimum threshold. In a second mode, when headroom is above the minimum threshold, a less aggressive approach can be employed to allow relatively higher consumption during the time in which the power limit is being reduced to address temperature considerations. In other words, in this second mode, power limits are still being reduced but the reduction is less severe. In other words, the different modes differ in the extent to which the associated attenuation power limit profile enforced a reduction in power consumption. Such context-aware attenuation provides the technical effect of controlling temperature conditions while still enabling elevated power consumption.

Referring now to FIG. 1, the figure depicts various power and temperature scenarios, in which changing power and temperature conditions are plotted against time. The term "power" will be used herein in various ways. "Current power" or "instant power" will typically be used to refer to the actual power being consumed by a component/device at any given time. "Power limit" will refer to a cap imposed on power consumption at a particular time, such that the current power can vary so long as it remains below the cap. "Power limit profile" on the other hand will refer to the manner in which power consumption is limited over a range of time. As described elsewhere, this profile can entail a static limit over the range or any function describing a power limit that varies over the time range. Thus, with respect to "power limit profile", such a profile may include a single static power limit level, or one or more different power limit levels that vary over the timespan of the power limit profile.

In FIG. 1, The solid line indicated at 102 which varies up and down in discrete steps across the width of the plot is a power limit profile that reflects the power limit in effect at any given time over the life of the profile. The power delivered to/consumed by the system (e.g., a system-on-chip SOC) can be at any level up to this capped amount. In other words, power consumption can rise and fall based on device state/activity, but consumption is limited to the level specified by power limit profile 102. Power limit profile 102 is set to provide transient power boost as needed/desired and to manage temperature conditions within the computing system, for example, as described elsewhere, to keep temperatures within skin and device limits. In some cases, actual power consumed will be somewhat below that of power limit profile 102, such that the resultant temperatures will have even a larger margin of safety than that which would result if power were fully consumed to limit 102. However, it will often be the case that a hardware component or process will more or less immediately take advantage of an increased cap, such that actual power used rises to the level permitted by the cap.

The power limits specified by a power limit profile may be implemented in a variety of ways. In some cases, the actual power made available to an SOC or other component is controlled directly, for example by controlling voltage delivered from a power supply, battery, or other source. In other cases, other aspects of a system are controlled so that the resulting power consumption will be in line with what is needed to enforce the power limit profile. For example, the frequency of a processor can be controlled to enforce a power limit. In other examples, certain activities are limited (or permitted); throttling may be used; voltage caps may be employed for one or more cores, etc. Accordingly, in some examples, the power limits associated with a power limit profile can correspond to expected power consumption—e.g., determined empirically at design time—when a certain type of control other than direct control of power delivery is exerted. In other words, in some cases, a power limit profile can be thought of as a controlling of something other than power to produce a desired cap on power. When such indirect methods are employed, monitoring at design time or during real-world operation can be employed to determine/correct the predicted effect on actual power consumption. Still further, adaptive learning may be used to tune calculations to improve the accuracy of power controls.

As will be discussed in detail below, a power limit profile can be associated with, or specified for, any appropriate time interval. For example, power limit profile 102 applies to the entire interval encompassed by the horizontal time axis of FIG. 1. It will be noted, however, that in connection with various times indicated in the figure ($T_1$, $T_2$, ... $T_6$), power limit profiles may be associated with any range associated with those times. For example, the power limit profile between times $T_2$ and $T_5$ involves three different constant levels (a first limit level in effect from $T_2$ to $T_3$; a second, lower level from $T_3$ to $T_4$; and a third, still lower level from $T_4$ to $T_5$). These three steps thus collectively may be considered a single power limit profile rather than three separate profiles. The present example contemplates discrete steps to constant power levels (i.e., from $T_0$ to $T_1$, $T_1$ to $T_2$, etc.), though any power level as a function of time may be employed (linear slopes, curve functions, etc.).

Referring still to power values shown in FIG. 1, the thermal design power level is indicated at 104. Again, this is the baseline power level at which the computing system can operate without producing unsustainable increases in temperature toward maximum limits. This level is influenced by, for example, material properties of the computing system and the various structures and mechanisms employed for dissipating heat. From the figure, it will be noted that the power consumption limits imposed by a power limit profile can hold power below thermal design power 104 (e.g., prior to time $T_1$ and after time $T_6$) or permit consumption above thermal design power 104 (e.g., between times $T_1$ and $T_6$). Allowing power consumption to temporarily be above the thermal design power can be desirable to support short-term computationally intensive operations. In some examples, burst cycles are employed, in which power is periodically allowed to burst thermal design power to service recurring compute-intensive operations.

FIG. 1 also shows temperature levels via a secondary vertical axis to the right of the figure. At 106, a temperature limit is indicated. Limit 106 is a maximum threshold against which current temperatures are assessed in order to mitigate against situations where the current temperature rises too close to the limit. Limit 106 may be, as previously discussed, a skin temperature limit, device limit such as a junction limit, or any other power-affected temperature limit that it is desirable to say within.

FIG. 1 also shows a current temperature at dashed line 108, revealing a current temperature—e.g., indicated by a sensor—that rises and falls over the time range spanned by the figure, due to varying power consumption. Again, this can be skin temperature, junction temperature, etc. As previously discussed, actual power consumption is not shown in FIG. 1, however the fact that temperature 108 rises and falls in relative conformity with power limit profile 102 is an indication in this example that power is being consumed at levels that are both above thermal design power and likely close to that permitted by power limit profile 102. For example, at time $T_1$, the power limit rises sharply, and is followed closely by a sharp rise in temperature. This is an indication that the computing system quickly took advantage of higher limit and increased power consumption to well above thermal design power 104.

On the other hand, scenarios exist where actual power consumed is significantly less than imposed limits. For example, suppose that, between time $T_1$ and $T_2$, actual power consumption was below thermal design power 104 even though the indicated limit is much higher. In such a case, the resulting temperature would be below that indicated by line 108 for that time interval, and potentially would continue the decreasing temperature trend shown just prior to time $T_1$. Generally, power limit profiles in the examples herein are configured so that, even if power is consumed to maximum permitted by the profile, there is still a margin of temperature safety below the relevant skin/junction temperature limit.

As previously discussed, sustained power consumption above the thermal design power limit 104 can push temperatures toward maximum limits. Accordingly, from time to time, power limit profiles can be adjusted to curb power consumption and thereby manage temperature conditions. In many prior approaches, power limits are quickly scaled back to levels below thermal design power in response to elevated temperature. In many cases, however, this approach is overly aggressive and can deprive systems/processes from making beneficial use of available power resources. The present approach instead employs a variable context-aware mechanism that is informed by, among other things, the thermal headroom between existing temperature conditions and temperature limits. When sufficient headroom is present, a level of burst above thermal design power may be sustained in a way that is responsive to headroom, as opposed to an automatic, fixed decrease toward thermal design power levels. The present context-aware approach has the technical benefit of making more power available for transient use during periods of high demand while still appropriately managing temperature. In other words, in the presence of significant headroom, an attenuation power limit profile can be employed which scales back power consumption less aggressively than if very little headroom was available.

Figure 2:
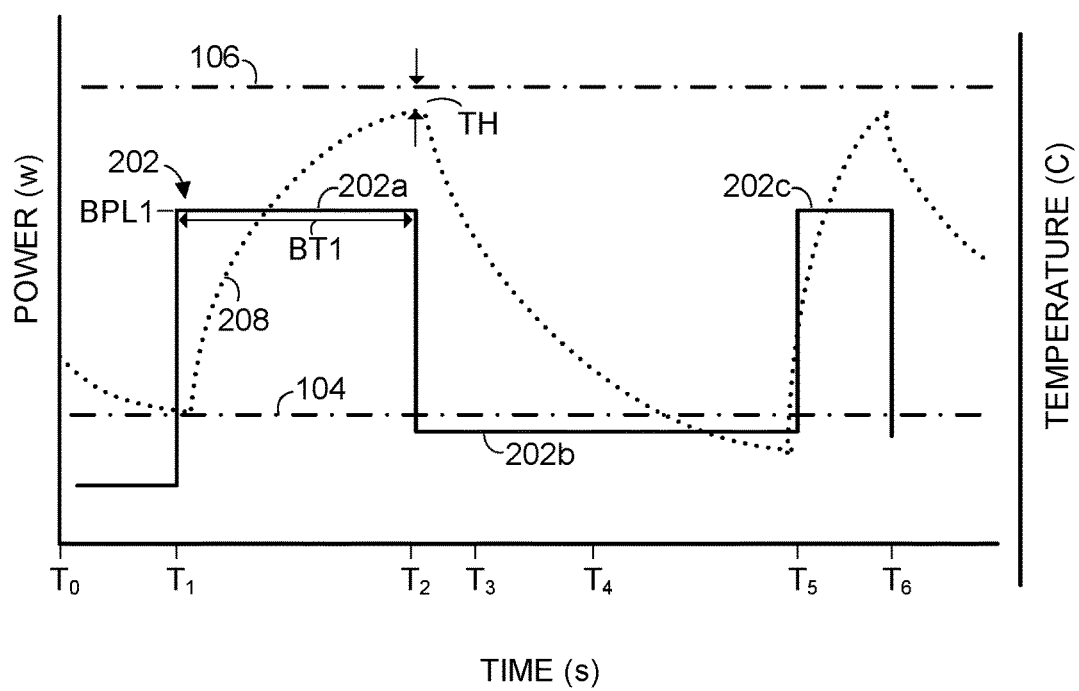
Figure 3:
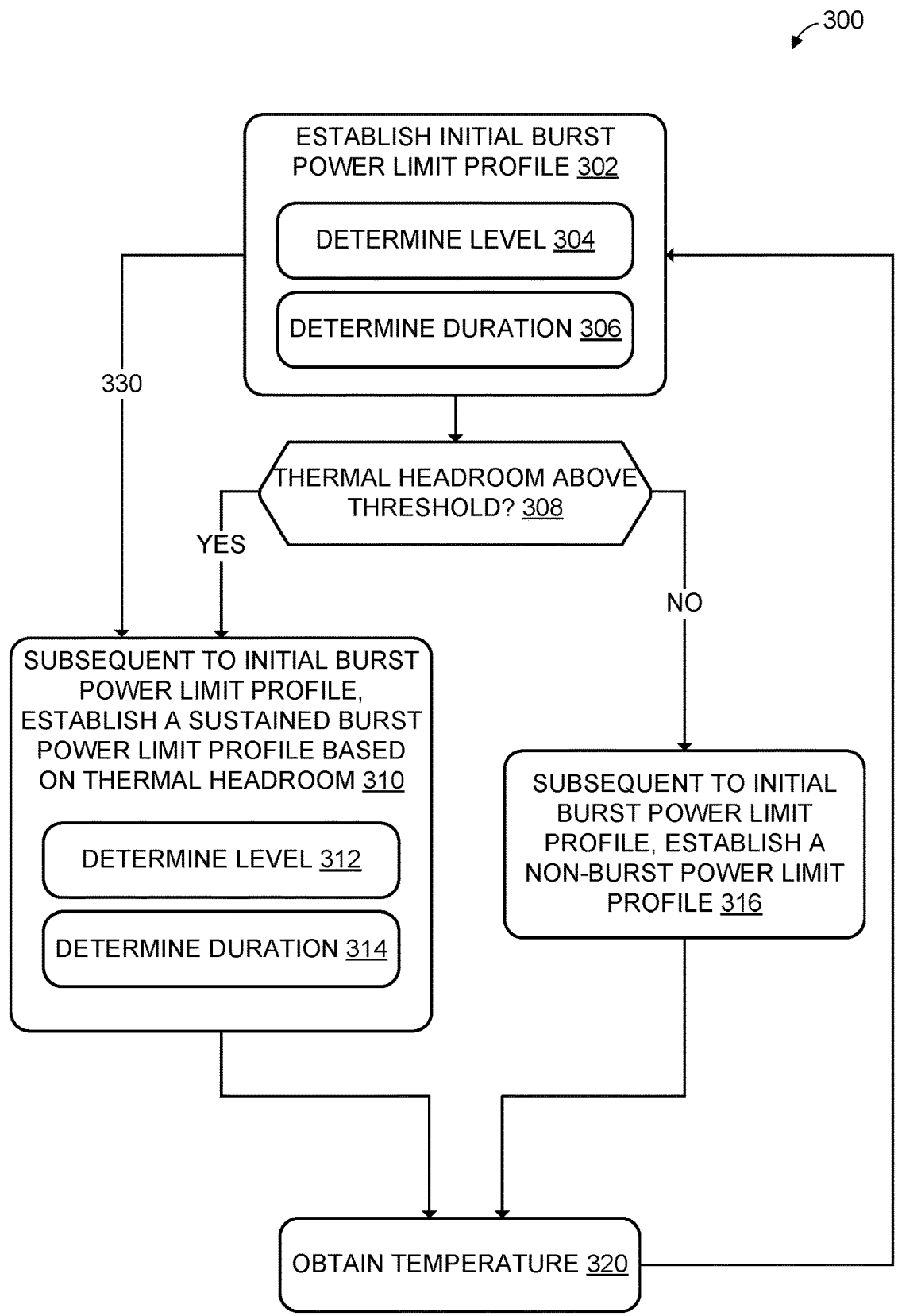
FIG. 3 depicts an exemplary method for implementing power limit profiles in a computing system to manage temperature.

Referring now to FIGS. 2 and 3, together with continued reference to FIG. 1, various examples of imposing power limit profiles to manage temperature will be described. FIG. 2 is a power and temperature plot that corresponds to FIG. 1: the figure shows times $T_0$ through $T_6$; thermal design power 104; and temperature threshold 106. FIG. 2 differs from FIG. 1 in that temperature 208 is different (more elevated in times) due to higher power consumption. Power limit power limit profile 202 is accordingly different because it is responsive to the fact that temperature 208 at times closely approaches limit 106.

FIG. 3 depicts a method 300 of generating and imposing a power limit profile to maintain beneficial temperature conditions in a computing system. In general, the method contemplates a burst cycle in which the power limit is first increased to a level above thermal design power, for example as part of a strategy to accommodate power for a transient compute-intensive operation. The amount of the limit increase and its duration in some examples is based at least on a current temperature condition, which may include or be based on one or more of a skin temperature, device temperature, etc. After the initial elevation, the power limit is decreased in a manner that is dependent upon thermal headroom. When significant headroom is available, the power limit profile may more gradually decrease the limit, so as to make more boosted power available. Such power profile implementation provides the technical effects of selectively and intelligently increasing the power available to components and systems while mitigating temperature conditions that could potentially be adverse as a result of the increased power consumption.

At 302, the method includes establishing an initial burst power limit profile. The power profile is referred to as a "burst" because it involves an increase in the power limit to a level above thermal design power, e.g., to provide short-term elevated power. This may be performed at any appropriate time. In some cases, establishing the initial burst limit profile is triggered in response to a sensed event, for example the initiation of a compute-intensive task. In other examples, some type of scheduled mechanism can be employed, for example establishing the initial burst power limit profile at the expiration of a timer. Establishing the initial burst power limit profile may include determining a level of the power limit, as shown at 304 and/or a duration over which that limit is to be imposed, as shown at 306. In some examples, the level will be constant over the duration, though time varying levels may be employed. It will be appreciated that any other suitable characteristic may be implemented in connection with the establishment of the burst power limit profile. For example, rates of increase/decrease may be specified; particular on-the-fly adjustments may be specified to trigger based on conditions; etc.

One or more characteristics of the initial burst power limit profile may be based on a temperature condition, which may include thermal headroom between a current temperature and one or more temperature limits. For example, in cases of less headroom, it may be desirable employ a lower permitted level of power and/or allow it to persist for a shorter duration before reevaluation of the limit profile. On the other hand, when a larger margin of temperature safety exists (more thermal headroom), then higher power limits may be established and/or be allowed to persist for longer durations before re-determination. Prior to step 302, a temperature may be obtained (not shown), which may include obtaining/deriving a skin temperature and a junction temperature.

FIG. 1 includes an example of an initial burst power limit profile 102a implemented at time $T_1$. This limit is established at a power level of BPL1 for duration BT1 ("burst power level" and "burst time," respectively). FIG. 2 shows a similar initial burst power limit profile 202a rising to a constant limit of BPL1 for duration BT1. In both cases, the limit is a "burst" limit in that it permits a boosted power limit that allows consumption/demand above the baseline thermal design power 104.

Continuing with FIG. 3, the method includes, at the expiration of the initial power burst limit profile, implementing a managed decrease in the power limit through implementation of one or more subsequent power limit profiles. Such managed decrease can be based on current temperature conditions and implemented to control temperatures while increasing the ability to use elevated power levels under certain conditions. These subsequent power limit profiles typically involve a reduction in power limit levels and thus are referred to as attenuation power limit profiles.

In the present example, the amount of thermal headroom between a current temperature condition and one or more temperature limits influences the degree to which an attenuation power limit profile curbs power consumption. In some cases, different attenuation modes can be employed based on whether thermal headroom is above or below a threshold. When temperatures are well below limits, such that thermal headroom is above a threshold, a less aggressive approach/mode may be used to limit power after the initial burst period. Accordingly, at 308, method 300 includes determining whether a thermal headroom threshold is satisfied. Such an assessment might include, for example, determining whether a chassis temperature of a device is sufficiently below a skin temperature maximum limit. Assessment in other examples can include determining whether multiple temperature fall within thresholds, for example determining that sufficient headroom existing when both a skin temperature and junction temperature are within respective limits. In some examples, a "percentage-of-maximum" approach is employed, in which an above-threshold condition is "true" if (1) a skin temperature of the computing system is less than a predefined percentage of a maximum skin temperature and/or (2) a device temperature of the computing system is less than a predefined percentage of a maximum device temperature.

If sufficient thermal headroom is present, the method proceeds at 310 to establishing a further burst power limit profile, after the initial burst power limit profile. The subsequent attenuation profile is a "sustained" burst power limit profile in that it less aggressively curbs power limits and thereby provides sustained access to elevated power levels above thermal design power, relative to approaches that immediately drop power limits to thermal design power or lower levels and/or that are otherwise more aggressive in curbing power. One or more characteristics of the sustained burst power limit profile are determined based on the amount of thermal headroom. In particular, one or more power limit levels may be determined based on thermal headroom, as well as the duration at which limit levels are maintained, as shown respectively at 312 and 314.

Referring again to FIG. 1, the figure shows establishment of a sustained burst power limit profile 102b at time $T_2$, at the expiration of initial burst power limit profile 102a. A sustained burst profile is employed at time $T_2$ in response to determining that the temperature headroom TH at time $T_2$ satisfies a threshold condition, as referenced at 308 in FIG. 3. In other words, there is sufficient headroom to warrant a more moderate approach to decreasing the power limit. Sustained burst power limit profile 102b extends from time $T_2$ to time $T_5$ and is a step function with three discrete portions:

1. From time $T_2$ to $T_3$, power limit at level BPL2 for duration BT2;
2. From time $T_3$ to $T_4$, power limit at level BPL3 for duration BT3; and
3. From time $T_4$ to $T_5$, power limit at level BPL4 for duration BT4.

It will be appreciated that the power levels BPL2/BLP3/BPL4 and durations BT2/BT3/BT4 factor into how severely power limits are scaled back to manage temperature effects. As indicated at 312 and 314 of FIG. 3, these parameters can be determined at least in part based on thermal headroom. If there were more thermal headroom than shown in FIG. 1, the sustained burst power limit profile could more modestly reduce the power limit. This could include one or more of levels BPL2, BPL3, and BPL4 being higher than as depicted in FIG. 2. This could also include one or more of durations BT2, BT3, and BT4 being longer in duration to allow a given limit level to last longer before dropping down another step. Conversely, in a case of more limited headroom, levels BPL2, BPL3, and BPL4 could be lower and durations BT2, BT3, and BT4 shorter to limit power and control temperature more quickly. Use of a stepped function as described above with selected levels and durations can enable precise and variable control over power limits to permit elevated power in a way that still allows for desirable temperature control.

The step function just described is but a non-limiting example—any number of steps may be employed. Also, non-stepped configurations are possible involving non-constant, time-varying levels (e.g., curves, sloped lines, and the like).

Producing a sustained burst power limit profile as discussed above provides the technical effect and benefit of maintaining elevated power for use by various systems and processes. Moreover the amount and duration of the elevated power is intelligently controlled in response to thermal headroom so that the elevated power is maintained without undesirable compromise of temperature conditions.

Referring back to the assessment at 308 in FIG. 3, if there is insufficient headroom, the method proceeds to 316, where it includes establishing a non-burst power limit profile. This limit is at a non-burst level, such as at or below the thermal design power, where the system can operate for relatively long periods while effectively dissipating heat so that temperatures don't rise toward skin or other limits. This scenario is depicted in FIG. 2. At time $T_2$ in FIG. 2, there is very little thermal headroom TH (significantly less that at time $T_2$ in FIG. 1), and the system thus responds to quickly drop the power limit to the non-burst power limit profile 202b, i.e., a constant level below thermal design power 104.

In some examples, the thermal headroom threshold can vary over time or based on certain conditions. For example, it can be the case that a particular thermal headroom threshold used for one process/application/task/etc. be different than a threshold used in another context. Still further, adaptive learning may be employed to tune the threshold over time, to improve the management of temperature and the balancing of such temperature management with the desire to deliver elevated power levels and thereby enhance performance.

At 320 in FIG. 3, the depicted method includes an assessment of temperature conditions. As previously indicated, this can be a sensing or other determination of skin temperature, device temperatures (e.g., SOC package temperature) or any other temperature relevant to managing power. The temperatures assessed at 320 can then be used as inputs to inform generation of further burst power limit profiles, such as the burst power limit profile 102c of FIG. 1 or the burst power limit profile 202c of FIG. 2. It will be appreciated that although FIG. 3 potentially suggests that temperature assessments are made only after step 302, one or more temperature assessments and sensing steps can occur before step 302 so as to influence the character of the power limit profile being generated at that step.

Still referring to FIG. 3, as indicated by arrow 330, an attenuation power limit profile may be established without explicit reference to a thermal headroom threshold. In other words, approaches may be employed that do not use the aforementioned "modes", but which still consider thermal headroom. Specifically, an attenuation power limit profile can be established at 310 based on thermal headroom, without particularly referencing whether that headroom is above or below a specified threshold. Such context-aware attenuation provides the technical effect of controlling temperature conditions while still enabling elevated power consumption.

Temperatures used in the present systems and methods may be sensed or determined in various manners. Regarding skin temperatures (e.g., surfaces the user touches), the skin temperature may be determined as follows (Equation 1):

$$T_{skin} = T_{Ambient} + P_{Thermal} \cdot \theta_{chassis\text{-}ambient} \qquad (1)$$

Where $T_{skin}$ (° C.)=chassis skin temperature $T_{Ambient}$ (° C.)=ambient temperature $P_{thermal}$ (Watt)=system base thermal power where SOC is located $\theta_{chassis\text{-}ambient}$ (° C./W)=thermal impedance between ambient temp and chassis $T_{Ambient}$ may in some examples be directly measured with sensors, with $T_{skin}$ being derived from $T_{Ambient}$ and other parameters. $P_{Thermal}$ in typical examples will be derived from a series of instantaneous readings of the thermal output of the system base where the SOC is located. In particular, the $P_{Thermal}$ may be a moving average of readings from a power meter or like mechanism. The period over which readings are sampled to generate the average may be relatively longer or shorter (i.e., slow vs. fast moving average). These are but examples, any approach may be taken to generate a power term for the above skin temperature equation. Regarding the chassis-ambient thermal impedance, that parameter will in most cases depend on the form factor of the computing system. In some examples, a value is determined at design time and used on a going forward basis. In other cases, an initially determined value can be updated via error correction in real-time use.

In some cases, the device temperatures referred to herein may be temperatures associated with junctions in semiconductor devices. Limits can be established for junction temperatures, and those limits can be used in connection with the thermal headroom assessment described with reference to FIGS. 1-3. In some examples, junction temperature may be determined as follows (Equation 2):

$$T_{junction} = T_{skin} \cdot P_{SOC\_Package} \cdot \theta_{SOC\text{-}chassis} \quad (2)$$

Where:
- $T_{junction}$ (° C.)=SOC junction temperature
- $T_{skin}$ (° C.)=Chassis Skin Temperature
- $P_{SOC\_Package}$ (Watt)=SOC Package Power
- $\theta_{SOC\text{-}chassis}$ (° C./W)=Thermal Impedance between chassis and SOC package Regarding the above junction temperature relationship, similar considerations apply. Namely, power readings from the SOC package can be averaged using any appropriate method, and thermal impedance may be established at design time and optionally adjusted as a result of run-time error correction.

In the examples of FIGS. 1 and 2, the thermal headroom assessment is depicted in connection with a single temperature limit. Thermal headroom may instead be assessed in FIGS. 1-2, and in step 308 of FIG. 3 with reference to multiple temperature limits. For example, whether sufficient headroom exists may depend upon determining that both skin temperature and junction temperature are below respective levels. For example, given a $T_{skin}$ limit of T_SKIN_MAX and a $T_{junction}$ limit of T_JUNCTION_MAX, sufficient headroom may depend on both of the following being true:

$$T_{skin} < 95\% \text{ of } T\_SKIN\_MAX; \text{ and}$$

$$T_{junction} < 90\% \text{ of } T\_JUNCTION\_MAX$$

In such a case, a second current temperature and second temperature limit could be represented in FIG. 1 and FIG. 2. It will be appreciated that this is but an example, and any combination of temperatures and levels may be employed. More generally, the present discussion is applicable to any method of obtained temperature conditions and applying them to the thermal headroom assessments described herein.

In the above examples, thermal headroom is referenced in connection with a temperature comparison—i.e., the difference between a measured temperature and a temperature limit. It will be understood, however, that the thermal headroom concept can be implemented in connection with any metric associated with the balancing of power/temperature considerations. For example, based on measured temperature or other conditions, a value can be generated which indicates the "level of concern" in relation to current temperature conditions, which in turn would dictate how aggressive mitigation would be through use of one or more attenuation power limit profiles.

Figure 4:
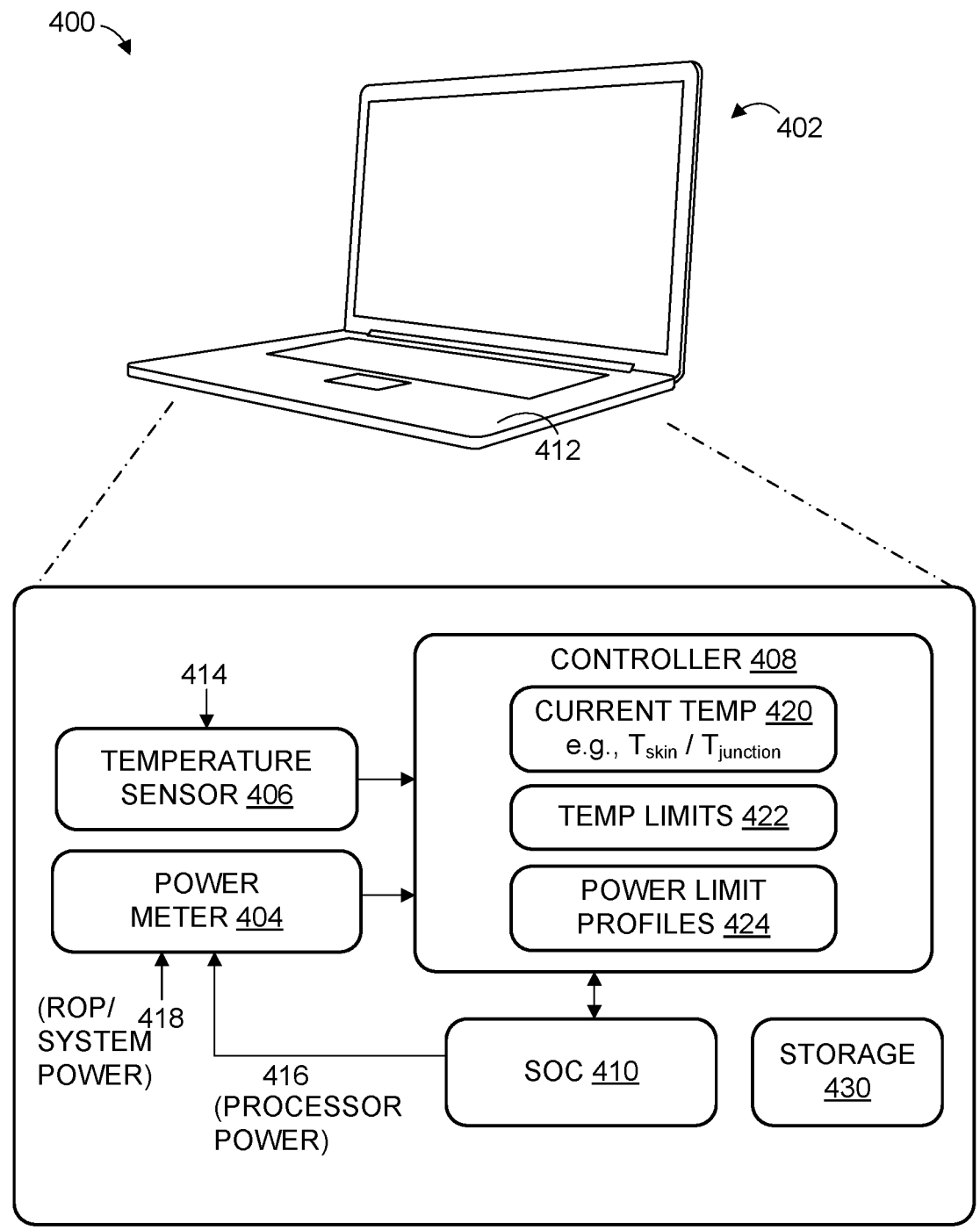
FIG. 4 depicts an exemplary computing system for implementing power limit profiles in a computing system to manage temperature.

FIG. 4 depicts aspects of an exemplary computing system 400 for obtaining power and temperature data for use in establishing power limit profiles. System 400 is implemented in the form factor of a laptop 402 that includes various internal components including a power meter 404, temperature sensor 406, controller 408, and a processing subsystem such as system-on-chip (SOC) 410. Though depicted as a laptop, it will be appreciated that the present discussion applies to tablet computers, mobiles, devices, wearables, or any other type of computing system subject to temperatures that need to be managed. Laptop 402 includes an exterior surface in the form of chassis 412, which can vary in temperature with power consumption.

In the present example, a temperature-sensing subsystem (e.g., temperature sensor 406) directly measures temperature data 414 for use in power limit profile determinations as discussed above. Such temperature data may include an ambient temperature for use in various temperature derivations, such as the determination of $T_{skin}$ in Equation (1) above. In other examples, a temperature sensor may not be employed, and all relevant temperature information may be derived from other operation aspects of the computing device, such as charger state, processor frequencies, activated cores, etc.

Power meter 404 collects power information from various system components. The power information may be used, as in Equations (1) and (2) to determine the present temperature conditions in computing system 400. The temperature conditions are used, in turn, as described above to assess thermal headroom and appropriately manage power limits. In the present example, power meter 404 receives SOC power data 416 and ROP (rest-of-system power) power data 418. Voltage and current data in each case may be measured to determine instantaneous power levels, though power data may be obtained other than through measurement of current and voltage. SOC power data 416 relates to power consumption of SOC 410, while ROP power data 418 includes power consumption of other components of computing system 400, such as power consumption relating to the display screen, input devices, ports, etc.

SOC power data 416 and ROP power data 418 are passed to controller 408 for interpretation and processing to generate power limit profiles, such as those discussed with reference to FIGS. 1-3. Referring to Equation (1) above, the P Thermal term used to derive chassis skin temperature $T_{skin}$ may correspond to the system base thermal power of the computing system and may be derived from ROP power data 418. As previously described, any type of averaging may be employed to derive $P_{Thermal}$. SOC package power $P_{SOC\_Package}$ from Equation (2) above may be derived from SOC power data 416, again using the above-described averaging as important.

The above-described averaging of power data can provide significant technical benefits and advantages. Tuning the rate of averaging can enable finer control over how temperature is managed after initial burst cycles. For example, changing the averaging can affect skin and/or junction temperatures, and thus headroom, and thus the step function power limit profile between times $T_2$ and $T_5$ in FIG. 1. Averaging variation can affect the levels and durations in power limit profile 102b.

Thus, having the relevant power and temperature information, along with the thermal impedances of Equations (1) and (2), skin temperature $T_{skin}$ and junction temperature $T_{junction}$ values may be determined by controller 408 as the current temperature conditions, as indicated at 420. These values are assessed against one or more temperature limits 422 to generate one or more power limit profiles 424, such as profiles 102, 102a, 102b, 102c, 202, 202a, 202b, and 202c. Controller 408 is also configured to assess thermal headroom in the manner of step 308 and use the headroom as a factor in formulating the power limit profiles at steps 310 and 316.

The power limit profiles described above may be established and enforced in a variety of ways. Processor (e.g., SOC) speed may be reduced. Frequency or voltage caps may be employed for one or more cores. These are but examples—any number and variety of performance parameters may be throttled, constrained or reduced to enforce power limit profiles. Such control may be exerted by controller 408 directly or in concert with power supplies, power regulators, batteries, and the like. Rest-of-system power may also be controlled in any suitable way to limit power consumption. Such use of burst and attenuation profiles provides the technical effect of selectively and intelligently increasing the power available to components and systems while mitigating potentially adverse temperature conditions.

Regarding FIG. 4, it will be appreciated that the depicted system 400 is a non-limiting embodiment of a system that can enact one or more of the methods and processes described above. Though depicted as a laptop, the computing system may take the form of one or more other personal computers, server computers, tablet computers, home-entertainment computers, network computing devices, gaming devices, mobile computing devices, mobile communication devices (e.g., smart phone), and/or other computing devices.

Controller 408 and SOC 410 may collectively form a logic machine configured to execute instructions, such as the method of FIG. 3. Referring to 408 and SOC 410, and potentially other aspects of computing system 400, such a logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally, or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Computing system 400 may also include a storage machine 430. Storage machine 430 includes one or more physical devices configured to hold instructions executable by the logic machine to implement the methods and processes described herein. When such methods and processes are implemented, the state of storage machine?? may be transformed—e.g., to hold different data.

Storage machine 430 may include removable and/or built-in devices. Storage machine 430 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 430 may include volatile, nonvolatile, dynamic, static, read/write, read-only, random-access, sequential-access, location-addressable, file-addressable, and/or content-addressable devices.

It will be appreciated that storage machine 430 includes one or more physical devices. However, aspects of the instructions described herein alternatively may be propagated by a communication medium (e.g., an electromagnetic signal, an optical signal, etc.) that is not held by a physical device for a finite duration.

Aspects of the logic machine and storage machine 430 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

From the above, it will be appreciated that the present mechanisms for controlling power consumption contemplates power limits that rise and fall, as seen in the example of FIGS. 1 and 2, where respective profiles 102 and 202 increase and decrease over time. The timing of such fluctuations can occur or be controlled/managed in any suitable way. In some cases, power limits rise and fall due to asynchronous, and sometimes unpredictable, events—such as temperature(s) reaching certain levels, processes occurring within an operating system or application, hardware events, and the like.

In other cases, cycles may be implemented in a coordinated manner to deliver transient elevations in power at re-occurring intervals or events. For example, it may be desirable that a processor, task, thread, application, etc. be allowed to consume elevated power at regular intervals, which in some cases occur periodically or quasi-periodically. One example would be a compute-intensive graphics task that needs to perform a special calculation every N display frames. In this example, a burst power limit profile could be employed to service the transient need for elevated power and then, a short time later, an attenuation power limit profile could be employed to bring down the temperature in a desired and controlled manner. Such a regime might be implemented in general when a relevant application/process is running, and/or selectively get activated when the application/process enters a particular state/mode. The intelligent attenuation achieved through attenuation power limit profile can be employed not only to counterbalance increases toward skin and device temperature limits, but also to set up the system to provide a significant power boost at the next cycle. In this regard, it may be desirable in some cases for the attenuation power limit profile to bring temperature down more aggressively to increase the opportunity to elevate power at the next cycle.

From the above, it will be appreciated that a first example contemplates a method of controlling power consumption in a computing system, comprising: (1) establishing a burst power limit profile that permits consumption of power by the computing system to rise from a current power limit level to one or more elevated power limit levels that are above a thermal design power of the computing system; (2) upon expiration of the burst power limit profile, determining a thermal headroom of the computing system based at least on one or more temperature limits; and (3) establishing an attenuation power limit profile based at least on the thermal headroom, such attenuation power limit profile having one or more reduced power limit levels that are lower than one or more of the elevated power limit levels of the burst power limit profile.

In this first example, the one or more temperature limits may include a skin temperature associated with a surface portion of the computing system, and where such skin temperature may be a chassis temperature. In the first example, the one or more temperature limits may include a SOC junction temperature or other device temperature associated with performance of the computing system.

Determining thermal headroom in the first example may include determining whether it is above a thermal headroom threshold, and where a first mode of attenuation can be used to generate the attenuation power limit profile if the thermal headroom is above the thermal headroom threshold, and where a second, different mode of attenuation can be used to generate the attenuation power limit profile if the thermal headroom is not above the thermal headroom threshold, the first and second modes of attenuation differing in the extent to which the associated attenuation power limit profile enforces reduction in power consumption relative to the burst power limit profile. The threshold determinations may include determining whether a skin temperature and/or device temperature are less than predefined percentages of maximum values.

A second example includes a mechanism for controlling power consumption, comprising (1) a temperature-sensing subsystem; and (2) a controller. The controller is configured to: (1) establish a burst power limit profile that permits consumption of power by the computing system to rise from a current power limit level to one or more elevated power limit levels that are above a thermal design power of the computing system; (2) determine, upon expiration of the burst power limit profile, a thermal headroom of the computing system based at least on an output of the temperature-sensing subsystem, such output being based at least on one or more temperature limits; and (3) establish an attenuation power limit profile based at least on the thermal headroom, such attenuation power limit profile having one or more reduced power limit levels that are lower than one or more of the elevated power limit levels of the burst power limit profile. The one or more temperature limits can include (1) a chassis temperature or other skin temperature associated with a surface portion of the computing system, (2) an SOC junction temperature or other device temperature associated with performance of the computing system.

In the second example, the controller can be further configured to determine whether the thermal headroom is above a thermal headroom threshold, and where a first mode of attenuation is used to generate the attenuation power limit profile if the thermal headroom is above the thermal headroom threshold, and where a second, different mode of attenuation is used to generate the attenuation power limit profile if the thermal headroom is not above the thermal headroom threshold, the first and second modes of attenuation differing in the extent to which the associated attenuation power limit profile enforces reduction in power consumption relative to the burst power limit profile. The above-threshold determinations can be made if one or both of a skin temperature and a device temperature are less than a predefined percentage of an associated maximum value.

A third example is directed to a computing system with a mechanism for controlling power consumption, comprising (1) a temperature-sensing subsystem; and (2) a controller configured to: (a) establish a burst power limit profile that permits consumption of power by the computing system to rise from a current power limit level to one or more elevated power limit levels that are above a thermal design power of the computing system; (b) determine, upon expiration of the burst power limit profile, a thermal headroom of the computing system based at least on an output of the temperature-sensing subsystem, such output being based at least on a skin temperature of the computing system and a device temperature of the computing system; and (c) establish an attenuation power limit profile based at least on the thermal headroom, such attenuation power limit profile having one or more reduced power limit levels that are lower than one or more of the elevated power limit levels of the burst power limit profile, such attenuation power limit profile effecting a more pronounced reduction in power consumption in the event of a relatively lower amount of thermal headroom. The controller can be further configured to determine whether the thermal headroom is above a thermal headroom threshold, and where a first mode of attenuation is used to generate the attenuation power limit profile if the thermal headroom is above the thermal headroom threshold, and where a second, different mode of attenuation is used to generate the attenuation power limit profile if the thermal headroom is not above the thermal headroom threshold, the first and second modes of attenuation differing in the extent to which the associated attenuation power limit profile enforces reduction in power consumption relative to the burst power limit profile.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of controlling power consumption in a computing system, comprising:
    establishing a burst power limit profile that permits consumption of power by the computing system to rise from a current power limit level to one or more elevated power limit levels that are above a thermal design power of the computing system;
    upon expiration of the burst power limit profile, determining a thermal headroom of the computing system based at least on one or more temperature limits;
    determining whether the thermal headroom is above a thermal headroom threshold;
    based on the thermal headroom being above the thermal headroom threshold, establishing an attenuation power limit profile based at least on the thermal headroom, using a first mode of attenuation that enforces a reduction in consumption of power by the computing system to one or more reduced power limit levels that are lower than one or more of the elevated power limit levels of the burst power limit profile; and
    based on the thermal headroom being not above the thermal headroom threshold, establishing the attenuation power limit profile based at least on the thermal headroom using a second, different mode of attenuation that enforces a reduction in consumption of power by the computing system to a greater extent relative to the first mode of attenuation.

2. The method of claim 1, where the one or more temperature limits include a skin temperature associated with a surface portion of the computing system.

3. The method of claim 2, where the skin temperature is a chassis temperature.

4. The method of claim 1, where the one or more temperature limits include a device temperature of the computing system associated with performance of the computing system.

5. The method of claim 4, where the device temperature is an SOC junction temperature.

6. The method of claim 1, where the thermal headroom is determined to be above the thermal headroom threshold if a skin temperature of the computing system is less than a predefined percentage of a maximum skin temperature.

7. The method of claim 1, where the thermal headroom is determined to be above the thermal headroom threshold if a device temperature of the computing system is less than a predefined percentage of a maximum device temperature.

8. The method of claim 1, where the thermal headroom is determined to be above the thermal headroom threshold if both of the following are true: (1) the device temperature of the computing system is less than a predefined percentage of a maximum device temperature, and (2) a skin temperature of the computing system is less than a predefined percentage of a maximum skin temperature.

9. A computing system including a mechanism for controlling power consumption, comprising,
- a temperature-sensing subsystem;
- a controller configured to:
  - establish a burst power limit profile that permits consumption of power by the computing system to rise from a current power limit level to one or more elevated power limit levels that are above a thermal design power of the computing system;
  - determine, upon expiration of the burst power limit profile, a thermal headroom of the computing system based at least on an output of the temperature-sensing subsystem, such output being based at least on one or more temperature limits;
  - determine whether the thermal headroom is above a thermal headroom threshold;
  - based on the thermal headroom being above the thermal headroom threshold, establish an attenuation power limit profile based at least on the thermal headroom using a first mode of attenuation that enforces a reduction in consumption of power by the computing system to one or more reduced power limit levels that are lower than one or more of the elevated power limit levels of the burst power limit profile; and
  - based on the thermal headroom being not above the thermal headroom threshold, establishing the attenuation power limit profile based at least on the thermal headroom using a second, different mode of attenuation that enforces a reduction in consumption of power by the computing system to a greater extent relative to the first mode of attenuation.

10. The computing system of claim 9, where the one or more temperature limits include a skin temperature associated with a surface portion of the computing system.

11. The computing system of claim 10, where the skin temperature is a chassis temperature.

12. The computing system of claim 9, where the one or more temperature limits include a device temperature of the computing system associated with performance of the computing system.

13. The computing system of claim 12, where the device temperature is an SOC junction temperature.

14. The computing system of claim 9, where the thermal headroom is determined to be above the thermal headroom threshold if a skin temperature of the computing system is less than a predefined percentage of a maximum skin temperature.

15. The computing system of claim 9, where the thermal headroom is determined to be above the thermal headroom threshold if a device temperature of the computing system is less than a predefined percentage of a maximum device temperature.

16. The computing system of claim 9, where the thermal headroom is determined to be above the thermal headroom threshold if both of the following are true: (1) the device temperature of the computing system is less than a predefined percentage of a maximum device temperature, and (2) a skin temperature of the computing system is less than a predefined percentage of a maximum skin temperature.

17. A computing system including a mechanism for controlling power consumption, comprising,
- a temperature-sensing subsystem;
- a controller configured to:
  - establish a burst power limit profile that permits consumption of power by the computing system to rise from a current power limit level to one or more elevated power limit levels that are above a thermal design power of the computing system;
  - determine, upon expiration of the burst power limit profile, a thermal headroom of the computing system based at least on an output of the temperature-sensing subsystem, such output being based at least on at least one of a skin temperature of the computing system and a device temperature of the computing system;
  - determine whether the thermal headroom is above a thermal headroom threshold;
  - based on the thermal headroom being above the thermal headroom threshold, establish an attenuation power limit profile based at least on the thermal headroom using a first mode of attenuation that enforces a reduction in consumption of power by the computing system to one or more reduced power limit levels that are lower than one or more of the elevated power limit levels of the burst power limit profile, such attenuation power limit profile effecting a more pronounced reduction in power consumption in the event of a relatively lower amount of thermal headroom; and
  - based on the thermal headroom being not above the thermal headroom threshold, establishing the attenuation power limit profile based at least on the thermal headroom using a second, different mode of attenuation that enforces a reduction in consumption of power by the computing system to a greater extent relative to the first mode of attenuation.

18. The computing system of claim 17, where the thermal headroom is determined to be above the thermal headroom threshold if the skin temperature of the computing system is less than a predefined percentage of a maximum skin temperature.

19. The computing system of claim 17, where the thermal headroom is determined to be above the thermal headroom threshold if the device temperature of the computing system is less than a predefined percentage of a maximum device temperature.

20. The computing system of claim 17, where the thermal headroom is determined to be above the thermal headroom threshold if both of the following are true: (1) the device temperature of the computing system is less than a predefined percentage of a maximum device temperature, and (2) the skin temperature of the computing system is less than a predefined percentage of a maximum skin temperature.

* * * * *